United States Patent
Krauß et al.

(10) Patent No.: US 11,885,665 B1
(45) Date of Patent: Jan. 30, 2024

(54) DEVICE AND METHOD FOR WEIGHING INDIVIDUAL CONTAINERS, AND A SET COMPRISING SUCH A DEVICE

(71) Applicant: Syntegon Technology GmbH, Waiblingen (DE)

(72) Inventors: Ulrich Krauß, Ilshofen (DE); Stefan Nagler, Unterschneidheim (DE); Markus Ilgenfritz, Feuchtwangen (DE); Bertram Selig, Crailsheim (DE); Erich Hillenmeyer, Ellwangen (DE); Samuel Stegmeier, Kreßberg (DE)

(73) Assignee: Syntegon Technology GmbH, Waiblingen (DE)

( * ) Notice: Subject to any disclaimer, the term of this patent is extended or adjusted under 35 U.S.C. 154(b) by 0 days.

(21) Appl. No.: 18/350,235

(22) Filed: Jul. 11, 2023

(30) Foreign Application Priority Data

Jul. 11, 2022 (DE) .................... 10 2022 117 200.7

(51) Int. Cl.
*G01G 17/04* (2006.01)
*G01G 13/30* (2006.01)
(Continued)

(52) U.S. Cl.
CPC ........... *G01G 21/22* (2013.01); *G01G 13/006* (2013.01); *G01G 13/30* (2013.01); *G01G 19/52* (2013.01);
(Continued)

(58) Field of Classification Search
CPC .... G01G 13/006; G01G 13/30; G01G 15/006; G01G 17/04; G01G 21/22; G01G 19/52; B01L 9/543; B01L 2200/025
See application file for complete search history.

(56) References Cited

U.S. PATENT DOCUMENTS 5,115,876 A * 5/1992 Chang .................... G01G 15/00
177/145
5,193,630 A * 3/1993 Cane ...................... G01G 15/00
209/592
(Continued)

FOREIGN PATENT DOCUMENTS

CH 714170 B1 7/2021
DE 4023483 A1 2/1991
(Continued)

OTHER PUBLICATIONS

Computer translation of DE 10 2017 207307 donloaded from the EPO website on Nov. 28, 2023.*

(Continued)

*Primary Examiner* — Randy W Gibson
(74) *Attorney, Agent, or Firm* — Michael Best & Friedrich LLP

(57) ABSTRACT

A device (10) for weighing individual containers (14) arranged in a nest (12), wherein the containers (14) are formed with a bottom region (16) and a lid region (18) and the device (10) includes at least one weighing device (20) with at least one load cell (19) and with at least one weighing receptacle (22), and an arrangement unit (28). The weighing receptacle (22) and the arrangement unit (28) are arranged movable relative to each other in order to be able to move a container (14) arranged in the nest (12), which is arranged in the arrangement unit (28), completely out of the nest (12). The disclosure also relates to a set comprising such a device (10) and to a method for weighing individual containers (14) arranged in a nest (12).

12 Claims, 6 Drawing Sheets

(51) Int. Cl.
  *G01G 21/22* (2006.01)
  *G01G 15/00* (2006.01)
  *B01L 9/06* (2006.01)
  *B65B 3/00* (2006.01)
  *B65B 57/10* (2006.01)
  *G01G 13/00* (2006.01)
  *G01G 19/52* (2006.01)
  *B01L 9/00* (2006.01)

(52) U.S. Cl.
  CPC ......... *B01L 9/543* (2013.01); *B01L 2200/025* (2013.01); *B65B 3/006* (2013.01); *B65B 57/10* (2013.01); *G01G 15/006* (2013.01); *G01G 17/04* (2013.01)

(56) References Cited

U.S. PATENT DOCUMENTS

| 6,615,638 | B1* | 9/2003 | Lochner | B01L 3/021 |
| | | | | 177/229 |
| 7,172,729 | B2* | 2/2007 | Las Navas Garcia | G01N 5/045 |
| | | | | 422/78 |
| 11,047,727 | B2 | 6/2021 | Trebbi et al. | |
| 2022/0011151 | A1 | 1/2022 | Roth et al. | |

FOREIGN PATENT DOCUMENTS

| DE | 102016207600 A1 | 11/2017 |
| DE | 102017207307 A1 | 9/2018 |
| DE | 102018219402 A1 | 5/2020 |

OTHER PUBLICATIONS

German Patent Office Action for Application No. 10 2022 117 200.7, dated Mar. 4, 2023 (15 pages, English translation included).
German Patent Office Decision to Grant for Application No. 10 2022 117 200.7, dated Sep. 5, 2023 (22 pages, English translation included).
Extended European Search Report for Application No. 23180719.9 dated Nov. 10, 2023 (18 pages including machine English translation).

* cited by examiner

DEVICE AND METHOD FOR WEIGHING INDIVIDUAL CONTAINERS, AND A SET COMPRISING SUCH A DEVICE

BACKGROUND

The invention relates to a device for weighing individual containers, in particular pharmaceutical containers arranged in a nest, a set, and a method for weighing individual containers, in particular pharmaceutical containers, arranged in a nest.

Pharmaceutical containers, such as vials or syringes, are often arranged in a nest, e.g., for transport purposes. To check the correct filling quantity of the containers, they are weighed. The containers can be removed individually from the nest and weighed at a weighing station. Alternatively, weighing can be carried out directly in the nest.

DE 10 2016 207 600 A1 discloses a device for weighing containers arranged in a nest.

The disadvantage is that weighing the containers directly in the nest can cause them to tilt in the nest or rest on the nest during weighing and thus falsify the weighing result. This can lead to critical weighing errors, especially with small containers due to their very low weight.

SUMMARY

It is therefore the task of the present invention to provide a device and a method for weighing individual containers, in particular pharmaceutical containers, arranged in a nest, and a set comprising such a device, while eliminating the above disadvantages.

This task is solved by a device for weighing individual containers arranged in a nest. The containers can be pharmaceutical containers, such as vials, syringes, carpules, packaging materials, etc. The containers have a bottom region and a lid region. In particular, the containers are elongated. The containers may have a top end (lid region) and a bottom end (bottom region). The containers may be designed as syringes with a needle guard. In this case, the lower end of the needle guard, which points in the direction of gravity, can represent the bottom region. It is also conceivable, particularly in the case of relatively large syringes, that the region of the syringe adjacent to the needle guard may represent the bottom region.

The device comprises at least one weighing device for weighing the containers. The weighing device has at least one load cell for weighing the containers and at least one weighing receptacle for receiving the bottom region of one of the containers.

The weighing device can have several load cells. Each load cell can have several weighing receptacles. For example, several containers can be weighed simultaneously by means of a load cell with several weighing receptacles. It is also conceivable that only one container at a time can be weighed by means of the load cell.

The weighing receptacle can be designed in the form of a stamp (elongated).

The weighing receptacle can be designed in the form of a weighing stamp. The weighing receptacle can be arranged above (in relation to the direction of gravity) the load cell and be mechanically coupled to it.

The device further comprises an arrangement unit. The arrangement unit is set up to arrange the nest in the device for the weighing process. The arrangement unit can, for example, be set up as a handling device or robot or robot arm.

The device is designed such that the weighing receptacle and the arrangement unit are arranged movable relative to each other in order to be able to move a container arranged in the nest, which is arranged in the arrangement unit, completely out of the nest.

In the present case, "moving out completely" means that there is a distance between the container to be weighed and the nest, in particular along the direction of gravity. In particular, the container to be weighed is arranged above (in relation to the direction of gravity) the nest.

This allows the containers to be completely lifted out of the nest. This prevents the container from becoming jammed, tilted and/or resting in or on the nest. This increases weighing accuracy. In particular, undefined contact of the container to be weighed in the nest during the weighing process is avoided.

According to a further embodiment, the device can further comprise at least one centering device for centering the container to be weighed by means of the weighing device. In particular, the centering device is arranged to center the container to be weighed by means of the weighing device with respect to the weighing receptacle. The centering device may be designed to center the container to be weighed by means of the weighing device with respect to its bottom region. The centering device may be designed to perform centering between the lid region and the bottom region of the container to be weighed by means of the weighing device. The centering device can have a centering receptacle for receiving the lid region of the container to be weighed by means of the weighing device.

The centering receptacle can have a contact surface for, in particular, (full) circumferential contacting of the container to be centered (or its lid region). The centering receptacle and the weighing receptacle can be arranged in alignment with one another before and/or during weighing. The centering receptacle can be arranged above the weighing receptacle with respect to the direction of gravity and above the nest or the container to be weighed. The centering receptacle can be designed in such a way that the lid region of a container lies evenly, in particular along its circumference, in or against the centering receptacle (or contact surface).

This allows the containers to be lifted completely out of the nest in each case and centered, in particular with respect to the respective weighing receptacle.

The distance between the weighing device, in particular the weighing receptacle, and the centering device, in particular the centering receptacle, can be variable.

The arrangement unit may be designed to place the nest for the weighing process between the weighing device and the centering device, in particular between the weighing receptacle and the centering receptacle.

The arrangement unit, the weighing receptacle and/or the centering receptacle can be designed to be movable along the direction of gravity. Here, the relative movability between the individual elements is meant. For example, the arrangement unit and the weighing receptacle can be designed to be movable along the direction of gravity, and the centering receptacle can be designed to be fixed (immovable) along the direction of gravity. It is conceivable that the weighing receptacle can be designed fixed (immovable) along the direction of gravity and the arrangement unit and the centering receptacle can be designed movable along the direction of gravity. It is also conceivable that the arrangement unit can be designed to be fixed (immovable) along the direction of gravity and the weighing receptacle and the centering receptacle can be designed to be movable along the direction of gravity.

The arrangement unit, the weighing receptacle and/or the centering receptacle can be designed to be movable along a direction of movement (horizontal) oriented perpendicular to the direction of gravity.

The relative movements described above can be used to receive (position) the bottom region of a container in the weighing receptacle or the lid region of a container in the centering receptacle.

According to a further embodiment, the weighing receptacle and/or the centering receptacle can be designed to be exchangeable. The weighing receptacle and/or the centering receptacle can be designed to be exchangeable, in particular without tools. This means that the weighing receptacle and/or the centering receptacle can be exchanged, for example to adapt to different sizes and formats of containers.

According to a further embodiment, the device can have a handling device for changing the weighing receptacle and/or the centering receptacle. The handling device can be designed in the form of a robot or robot arm. This allows automated changing of the weighing receptacle and/or the centering receptacle. It is also conceivable that the arrangement unit is set up for changing the weighing receptacle and/or the centering receptacle.

The handling device can be designed as a gripping device or as a robot with a gripper (see below) to remove a container from the weighing device, in particular from the weighing receptacle, after weighing.

According to a further embodiment, the centering receptacle can have at least one pier, in particular four piers, for applying (exerting) a force on the container to be weighed, in particular in the direction of gravity, in order to return the container to the nest. This enables or at least facilitates a return of the container into a nest, in which the containers are held by, for example, resilient clips (e.g., lugs) or other retaining elements, e.g., on the lid region (or neck or neck region) of the containers.

According to a further embodiment, the centering receptacle can be designed as a centering ring. This allows round containers (or containers with a round lid region) to be optimally received or centered by means of the centering receptacle designed as a centering ring. It is also conceivable that the centering receptacle can have an angular (triangular, square, polygonal) or at least partially rounded (semicircular, elliptical) shape. This allows containers of different shapes to be optimally received or centered by means of the centering receptacle.

According to a further embodiment, the device may comprise a gripping device. The gripping device may be designed to remove a container from the weighing device after weighing. The gripping device may be designed to remove a container from the weighing receptacle. The removal of the container may be implemented mechanically or by means of negative pressure or vacuum. The gripping device may be configured as a separate handling device according to the above embodiments. In other words, the gripping device can be designed for handling (changing, removing) the weighing receptacle, the centering receptacle and/or a, in particular weighed, container. Thus, reject containers can be removed directly after weighing so that they are not returned to the nest.

According to a further embodiment, the device can have a filling and/or closing device. The filling and/or closing device can be designed to fill and/or close a container, the bottom region of which is received in the weighing receptacle. This enables filling and/or closing of the containers directly within the nest (or at the nest). Thus, for example, the filling process can be controlled by means of the weighing device and/or controlled by the weighing device.

Alternatively or additionally, the filling and/or closing device can be designed to fill and/or close a container whose lid region is received in the centering receptacle. This enables particularly precise filling and/or closing of the container, since the centering receptacle enables precise alignment of the lid region of a container.

The device can have a lift-out unit. The lift-out unit can be designed to mechanically decouple the weighing receptacle and the load cell. In other words, by means of the lift-out unit, the weighing receptacle can be decoupled (lifted) from the load cell, in particular mechanically. The lift-out unit may be arranged between the load cell and the weighing receptacle. The lift-out unit may be designed to lift the weighing receptacle (with respect to the direction of gravity) so that a distance is created between the weighing receptacle and the load cell. The lift-out unit may be designed to lower the weighing receptacle (with respect to the direction of gravity) so that no distance is created between the weighing receptacle and the load cell, in particular that the load cell and the weighing receptacle are arranged in contact with each other. The lift-out unit may be a part of the weighing device. The lift-out unit may be designed to be movable along the direction of gravity. The lift-out unit can be mechanically coupled to the weighing receptacle.

The lift-out unit can be used, for example, when containers, especially in the form of vials, are held in so-called clip nests via resilient retaining clips between a body and a neck of the containers and must be actively pressed upwards out of the nest against the resilient retaining clips.

The lift-out unit can remove the mechanical coupling between the weighing receptacle and the load cell so that the forces acting on the weighing receptacle are not transmitted to the load cell, which could lead to an overload and thus damage the load cell if the load is too high. For weighing the container, the mechanical coupling between the weighing receptacle and the load cell can be restored so that the weight force of the container to be weighed acting on the weighing receptacle during the weighing process can act (be transmitted) on the load cell and the container can be weighed by means of the load cell.

The above task is further solved by a set having the features of the disclosure. The set comprises a device according to the above embodiments, at least one nest and at least one, in particular pharmaceutical, container arranged in the nest. The container may be a container according to the above embodiments.

With regard to the advantages achievable with the set, reference is made to the explanations on the device in this respect. The measures described in connection with the device and/or those explained below can be used for the further design of the set.

The above task is further solved by a method for weighing individual containers arranged in a nest. The containers may be pharmaceutical containers, such as vials, syringes, carpules, packaging materials, etc. The containers have a bottom region and a lid region. In particular, the containers are elongated. The containers may have a top end (lid region) and a bottom end (bottom region). The containers may be designed as syringes with a needle guard. In this case, the lower end of the needle guard, which points in the direction of gravity, can represent the bottom region. It is also conceivable, particularly in the case of relatively large syringes, that the region of the syringe adjacent to the needle guard can represent the bottom region.

The procedure includes the steps:

Providing a nest with at least one container arranged therein.

Receiving the bottom region of a container to be weighed in a weighing receptacle of a weighing device in order to weigh it by means of the weighing device.

Completely lifting the container to be weighed out of the nest by moving the weighing receptacle and/or the nest relative to each other along the direction of gravity. In doing so, a first of these two elements (nest or weighing receptacle) may be held fixed (immobile) and the other, second, element may be moved (relative to the first element). The moving elements can be moved continuously or stepwise.

Weighing of the container completely lifted out of the nest by means of the weighing device.

The method may further comprise the step of:

Receiving the lid region of the container to be weighed in a centering receptacle in order to center it, in particular with respect to the weighing receptacle.

The complete lifting of the container to be weighed out of the nest can be implemented by moving the weighing receptacle, the centering receptacle and/or the nest relative to each other along the direction of gravity. In doing so, one of these three elements (nest, weighing receptacle, or centering receptacle) may be held fixed (immobile) and the other two elements may be moved (relative to each other). The moving elements can be moved continuously or stepwise.

It is conceivable that the container to be weighed is first lifted completely out of the nest, then its lid region is received in the centering receptacle, and then the lifted-out container is weighed.

It is also conceivable that the container to be weighed is first partially lifted out, then its lid region is received in the centering receptacle, then the container is lifted out completely, and then the lifted-out container is weighed. Thereby, after the lid region of a container to be weighed is received in the centering receptacle, the movement of the centering receptacle may be coupled to the movement of the weighing receptacle. In other words, the centering receptacle and the weighing receptacle may perform the same movement after the lid region of a container to be weighed is received in the centering receptacle.

The method may further comprise the step of:

Applying (exerting) a force, especially in the direction of gravity, to the weighed container to return it to the nest.

The method may include the steps of:

After weighing a container, determining whether the weighed container is a reject container.

Removing the container identified as a reject container from the weighing receptacle so that a container identified as a reject container is not returned to the nest.

The method may further comprise the step of:

Filling and/or closing of a container, the bottom region of which is received in the weighing receptacle.

Alternative or additional filling and/or closing of a container whose lid region is received in the centering receptacle.

A device according to the above embodiments or a set according to the above embodiments may be used to perform the method.

With regard to the advantages achievable with the method, reference is made to the explanations concerning the device or the set. The measures described in connection with the device or with the set and/or those explained below can be used for the further design of the method.

BRIEF DESCRIPTION OF THE DRAWINGS

Further features, details and advantages of the invention are apparent from the wording of the claims and from the following description of embodiments based on the drawings. Showing:

In the following description and in the figures, the corresponding components and elements have the same reference signs. For the sake of clarity, not all reference signs are shown in all figures.

DETAILED DESCRIPTION

Figure 1:
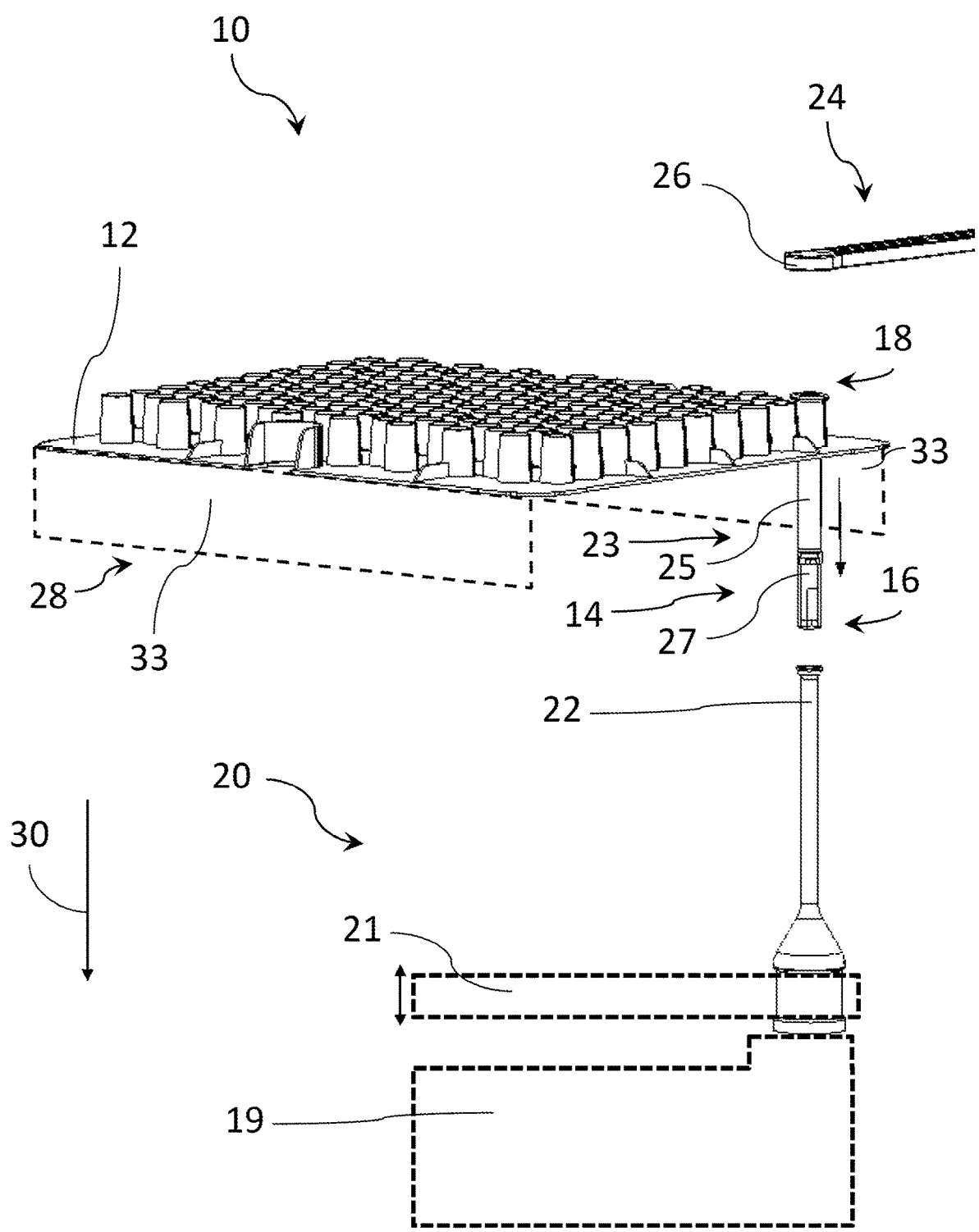
FIG. 1 a perspective view of the device according to the invention in a first state.

FIG. 1 shows a perspective view of the device 10 according to the invention in a first state. The device 10 is designed for weighing individual containers 14. The containers 14 are arranged in a nest 12. The containers 14 are elongated and have a bottom region 16 (lower end of the container 14) and a lid region 18 (upper end of the container 14). For clarity, only one container 14 is shown in the nest 12.

The container 14 shown in FIGS. 1 to 5 is a syringe 23 with a cylinder 25 (which can be filled with, for example, a liquid medicament) and a needle guard 27 which encloses a needle (not shown) arranged on the cylinder 25. Here, the bottom region 16 of the illustrated syringe 23 refers to the lower end of the needle guard 27. The syringe 23 can be closed by means of a plunger (not shown). By means of the plunger, the contents (for example, liquid medication) can be forced out of the cylinder 25 through the needle.

The device 10 comprises a weighing device 20 for weighing the containers 14. The weighing device 20 has a weighing receptacle 22. In the present case, the weighing receptacle 22 is a weighing stamp. The weighing receptacle 22 is adapted to receive the bottom region 16 of a container 14. In other words, the weighing receptacle 22 can receive a container 14 at its bottom region 16.

The weighing device 20 further comprises a load cell 19. The weighing receptacle 22 is arranged above (with respect to the direction of gravity 30) the load cell 19 and is mechanically coupled thereto. The weight force exerted on the weighing receptacle 22 by picking up the container can thus be transmitted (mechanically) to the load cell 19 and determined by means of the load cell 19. In other words, the container picked up in the weighing receptacle 22 is weighed by means of the load cell 19.

In the present case, the weighing device 21 has a lift-out unit 21. The lift-out unit 21 is designed to be movable along the direction of gravity 30. This is indicated in FIGS. 1 to 5 by means of a double arrow. In the present case, the lift-out unit 21 is coupled to the weighing receptacle 22 in such a way that a movement of the lift-out unit 21 along the direction of gravity 30 causes a movement of the weighing receptacle 22. In other words, by means of the lift-out unit 21, the weighing receptacle 22 can be moved relative to the load cell 19 along the direction of gravity 30 and thus be coupled to the load cell 19 or decoupled from the load cell 19.

Thus, the weighing receptacle 22 can be moved (lifted) upward by means of the lift-out unit 21 in FIG. 1 and thereby decoupled from the load cell 19. Then, the forces acting on the weighing receptacle 22 (e.g., during the lifting out of the container 14) are not transmitted to the load cell 19. For the weighing process, the weighing receptacle 22 can be moved downward (lowered) by means of the lift-out unit 21 in FIG. 1 and thereby mechanically coupled to the load cell 19, so that the lifted-out container 14 received in the weighing receptacle 22 can be weighed by means of the load cell 19.

The device 10 further comprises a centering device 24 for centering the container 14 received in the weighing receptacle 22 of the weighing device 20. For this purpose, the centering device 24 comprises a centering receptacle 26. The centering receptacle 26 is adapted to receive the lid region 18 of a container 14. In other words, the centering device 24 can center a container 14 at its lid region 18, in particular with respect to the weighing receptacle 22. In the present case, the centering receptacle 26 is configured as a centering ring.

Here, in the syringe 23 shown in FIGS. 1 to 5, the cover region 18 refers to the upper end (with respect to the direction of gravity 30) of the cylinder 25.

The device 10 further comprises an arrangement unit 28. The arrangement unit 28 is only schematically indicated in FIGS. 1 to 5 by means of two clamping jaws 33, which clamp the nest 12 on two opposite sides. The arrangement unit 28 is designed to position the nest 12 in the device 10 for the weighing process. For this purpose, the arrangement unit 28 positions the nest 12 between the weighing device 20 (or the weighing receptacle 22) and the centering device 24 (or the centering receptacle 26).

The centering device 24 is arranged above the weighing device 20 with respect to the direction of gravity 30, which is indicated in all the figures as an arrow. In the present case, the centering device 24 is arranged above the weighing device 20 in such a way that the centering receptacle 26 and the weighing receptacle 20 are arranged in alignment with one another.

In the present case, the weighing device 20 is designed to be immovable along the direction of gravity 30. The centering device 24 (and thus the centering receptacle 26) and the arrangement unit 28 (and thus the nest 12) are each designed to be movable along the direction of gravity 30. The arrangement unit 28 is also designed to be movable along a direction (horizontal) oriented perpendicular to the direction of gravity 30. Thus, the arrangement unit 28 is designed to be movable in all 3 spatial directions.

FIGS. 1 to 4 illustrate a weighing process of the illustrated container 14 by means of the device 10.

First, the nest 12 is positioned between the weighing device 20 and the centering device 24 by means of the arrangement device 28. In the process, the nest 12 (or the arrangement device 28), the centering device 24 and/or the weighing device 20 are moved along a direction oriented perpendicular to the direction of gravity 30 in such a way that the container 14 to be weighed (shown) is arranged with its bottom region 16 directly above the weighing receptacle 22 of the weighing device 20 and the centering receptacle 26 of the centering device 24 is arranged directly above the lid region 18 of the container 14 to be weighed (shown). The device 10 is then in the first state (FIG. 1).

In this context, the movement of the nest 12 (or the arrangement device 28), the centering device 24 (or the centering receptacle 26) and/or the weighing device 20 (or the weighing receptacle 22) along a direction oriented perpendicular to the direction of gravity 30 is to be understood as a relative movement. That is, one, two or all three elements (arrangement device 28, weighing device 20, centering device 24) can be moved. Thereby, the movement of these elements can be implemented continuously or stepwise.

From the first state of the device 10 shown in FIG. 1, the nest 12 is moved in the direction of gravity 30 (downwards in FIG. 1) by means of the arrangement device 28. This is indicated in FIG. 1 by means of an arrow. Thus, the container 14 received in the nest 12 is moved towards the weighing receptacle 22 of the weighing device 20.

The nest 12 is moved in the direction of gravity 30 until the container 14 with its bottom region 16 contacts the weighing receptacle 22 or is received in the weighing receptacle 22 of the weighing device 20. The nest 12 is then moved further in the direction of gravity 30 until the container 14 is partially lifted (with its lid region 18) out of the nest 12, so that the device 10 is arranged in a second state.

Figure 2:
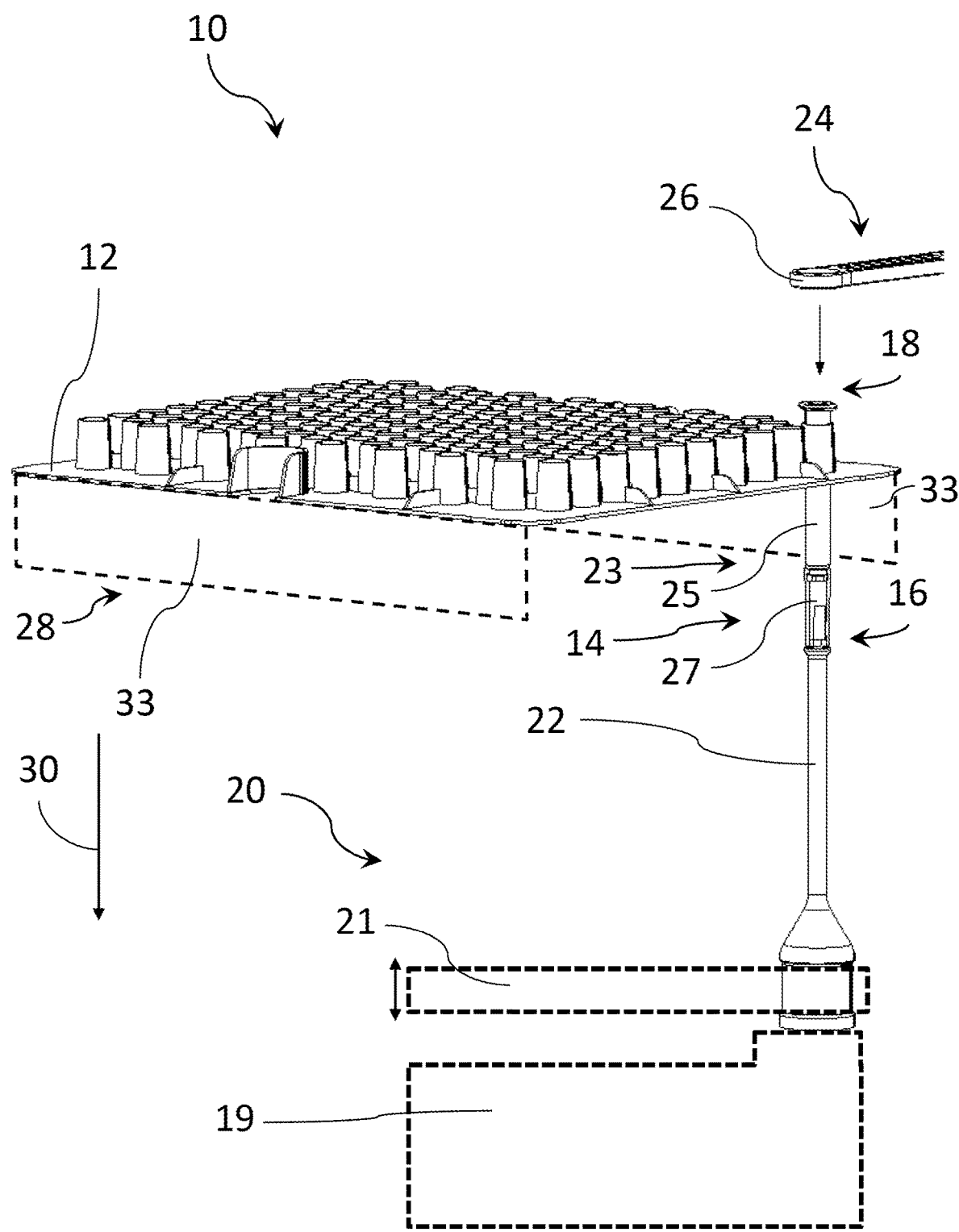
FIG. 2 a perspective view of the device according to FIG. 1 in a second state.

This second state of the device 10 according to FIG. 1 is shown in FIG. 2. In the second state of the device 10, the container 14 is partially lifted (with its lid region 18) out of the nest 12. From the second state, the centering device 24 and thus the centering receptacle 26 are moved in the direction of gravity 30 (downward in FIG. 2) toward the container 14 or its lid region 18.

This movement of the centering device 28 or of the centering receptacle 26 is carried out until the lid region 18 of the container 14 is received in the centering receptacle 26 or is contacted or centered by means of the centering receptacle 26. Thus, the device 10 is in a third state.

Figure 3:
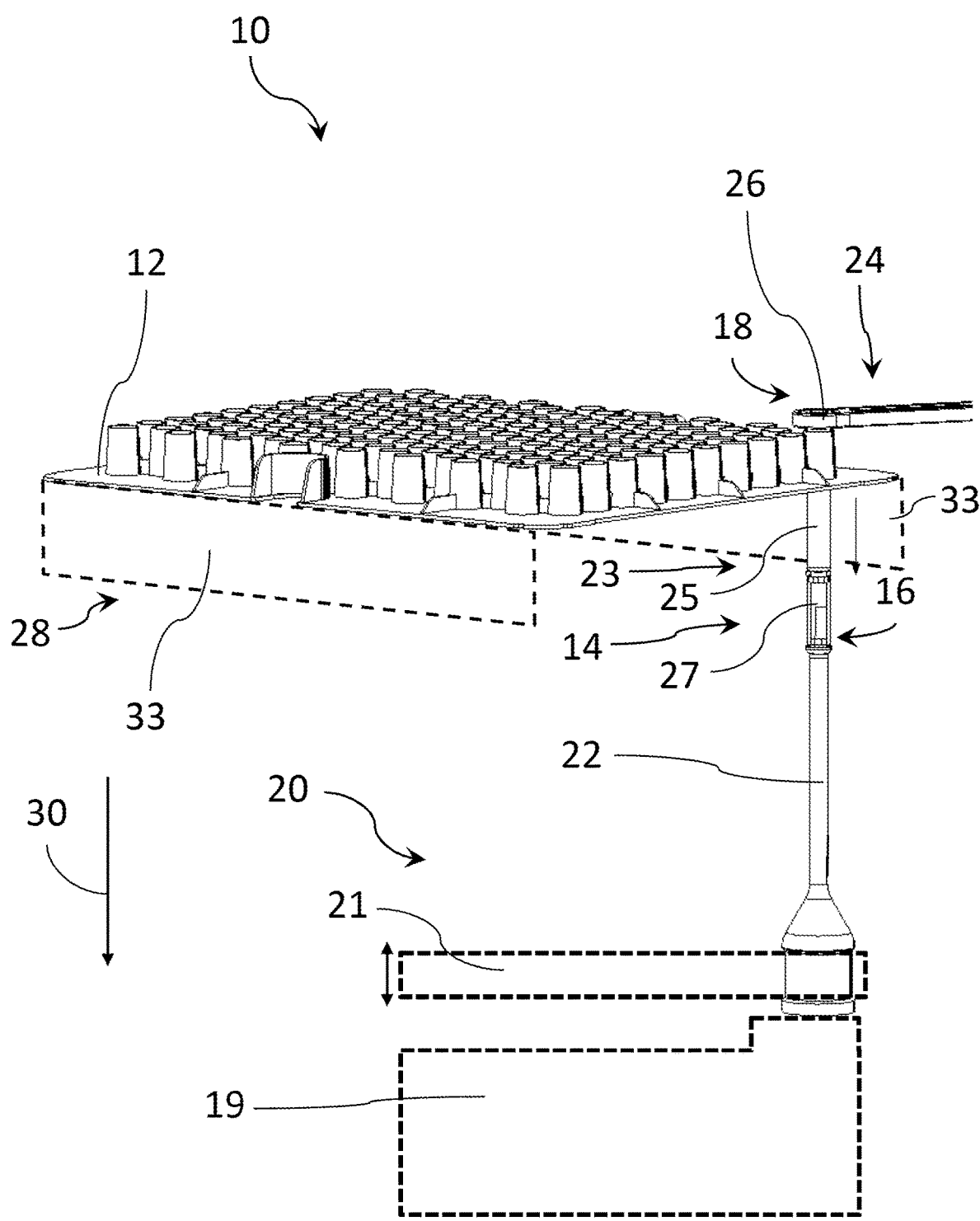
FIG. 3 a perspective view of the device according to FIG. 1 in a third state.

FIG. 3 shows a perspective view of the device 10 according to FIG. 1 in the third state. In the third state of the device 10, the container 14 is received or arranged with its bottom region 16 in the weighing receptacle 22 and with its lid region 18 in the centering receptacle 26. From this third state, the nest 12 is moved further in the direction of gravity 30 (downward in FIG. 3) until the container 14 is completely lifted out of the nest 12. The device is thus in a fourth state.

Figure 4:
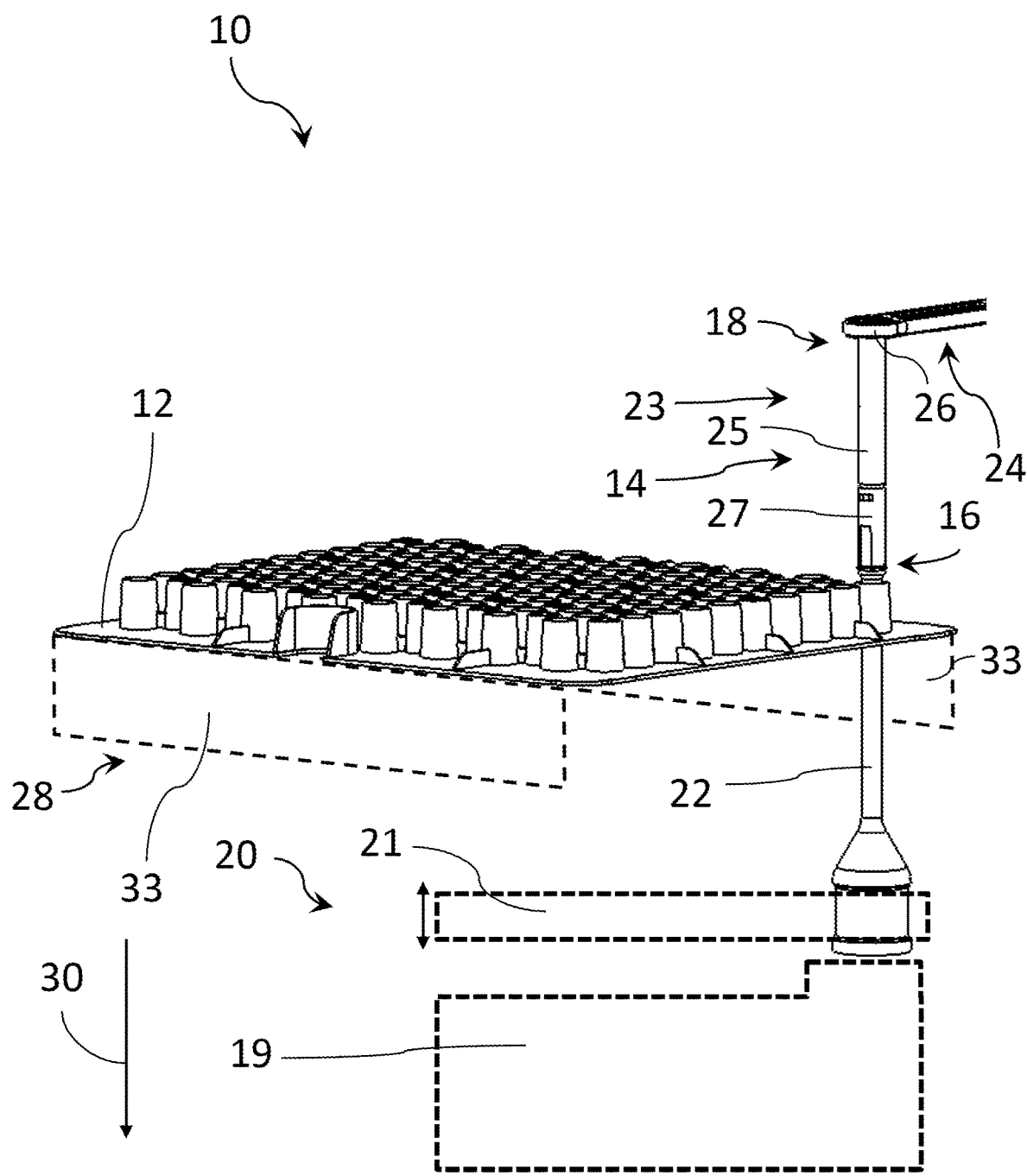
FIG. 4 a perspective view of the device according to FIG. 1 in a fourth state.

FIG. 4 shows a perspective view of the device 10 according to FIG. 1 in the fourth state. In the fourth state of the device 10, the weighing process is performed. In the fourth state of the device 10, the container 14 is completely lifted out of the nest 12 and does not contact the nest 12. The lifted-out container 14 is contacted or held exclusively by the weighing receptacle 22 and the centering receptacle 26. In this way, weighing inaccuracies that can arise, for example, due to the container 14 being jammed in the nest 12 and/or an undefined contact of the container 14 in the nest 12 can be avoided.

Figure 5:
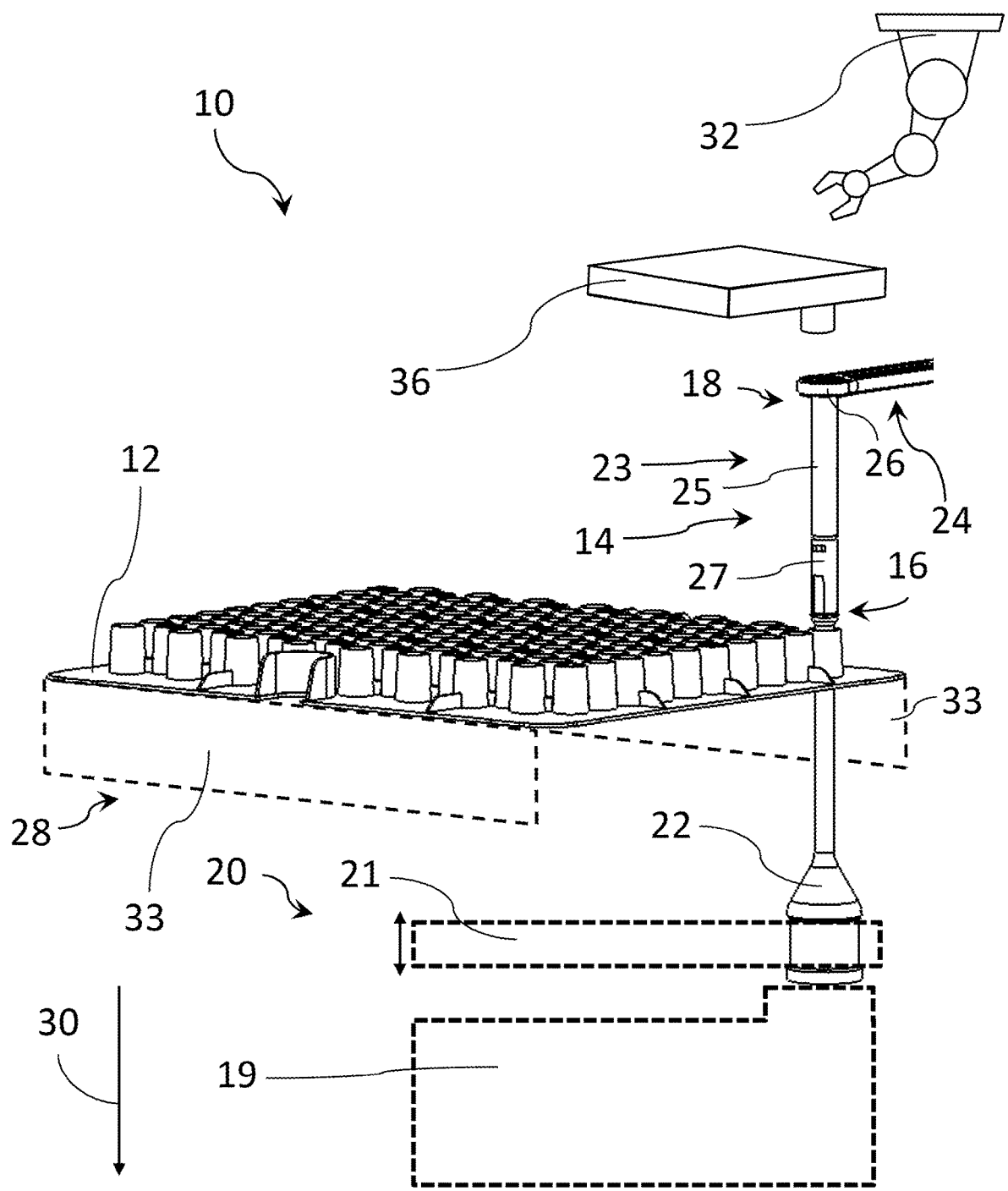
FIG. 5 a perspective view of the device according to a second embodiment, and FIG. 6 a section of a weighing device and a centering device of the device according to a third embodiment.

FIG. 5 shows a perspective view of the device 10 according to a second embodiment. The second embodiment of the device 10 differs from the first embodiment shown in FIGS. 1 to 4 by a handling device 32 and a filling and/or closing device 36. In addition, the weighing receptacle 22 and the centering receptacle 26 are designed to be interchangeable (exchangeable) according to the second embodiment of the device 10.

The handling device 32 is used to change the weighing receptacle 22 and/or the centering receptacle 26. The handling device 32 is designed as a robot arm. The handling device 32 is only schematically indicated in FIG. 5.

Thus, by means of the handling device 32, the weighing receptacle 22 and/or the centering receptacle 26 can be exchanged, for example, for another weighing receptacle 22 and/or another centering receptacle 26 with a different size and/or a different format. In this way, the device 10 can be automatically adapted to different sizes and/or formats of containers 14 by means of the handling device 32. It is conceivable that such a change can be carried out by means of the arrangement unit (which can be designed, for example, as a robot arm).

The filling and/or closing device 36 is used for filling and/or closing the containers 14. The filling and/or closing device 36 is only schematically indicated in FIG. 5. While the container 14 is being filled and/or closed, its bottom region 18 is received in the weighing receptacle 22 and its lid region 18 is received in the centering receptacle 26. Thus, the filling and/or closing process can be controlled by means of the weighing device 20 (or the load cell 19 of the weighing device 20), whereby the container 14 is precisely aligned by the centering device 24 for the filling and/or closing process.

Figure 6:
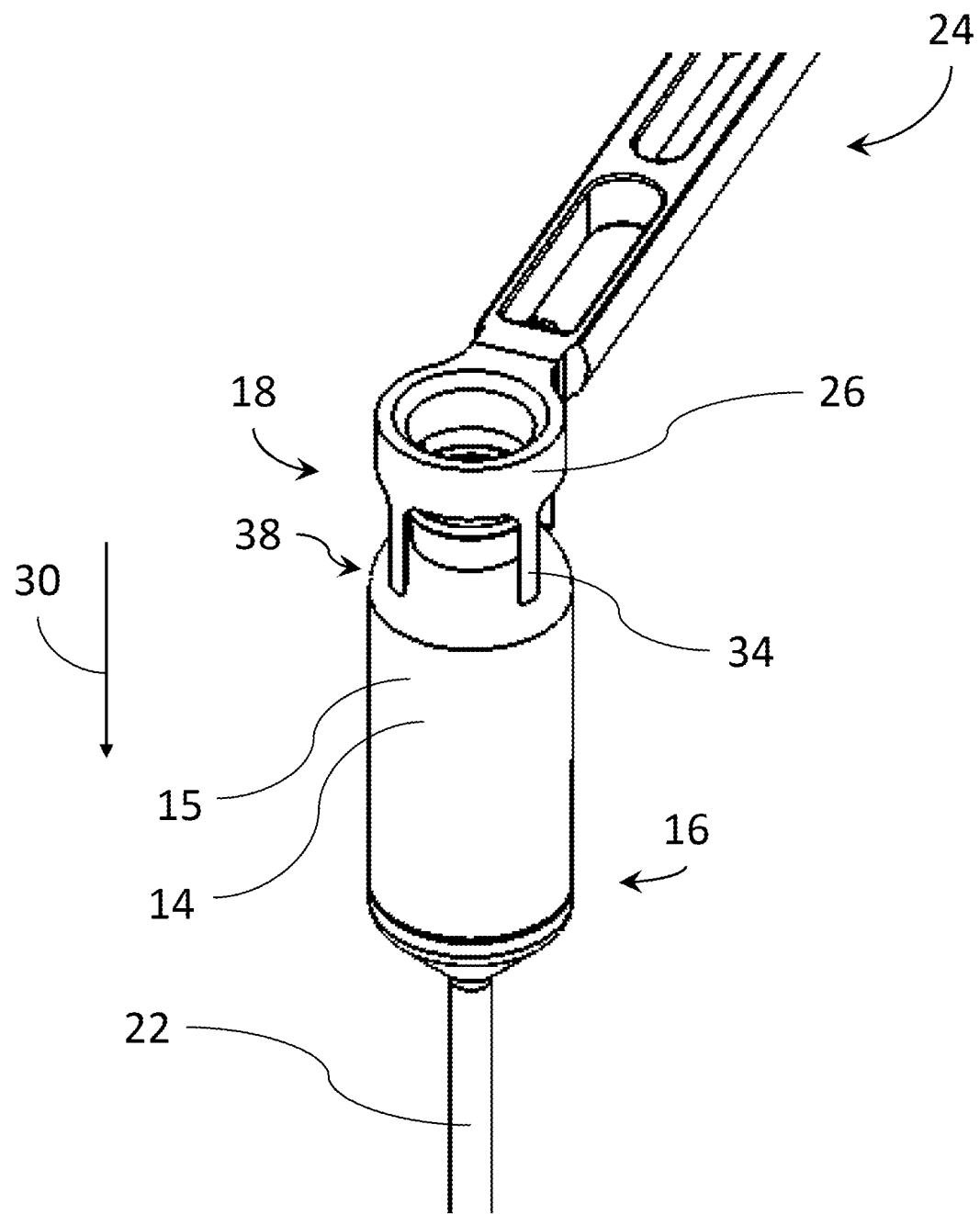

FIG. 6 shows a section of the weighing device 20 and the centering device 24 of the device 10 according to a third embodiment. The third embodiment of the device 10 differs from the two described above in that the weighing receptacle 22 and the centering receptacle 26 have a different size and shape.

The weighing receptacle 22 and the centering receptacle 26 are adapted to the container 14 shown, which in the present case is a vial 15. In other words, the weighing receptacle 22 and the centering receptacle 26 have a shape corresponding to the bottom region 16 and the lid region 18, respectively, of the vial 15. The vial 15 has a neck region 38. The neck region 38 is disposed below the lid region 18 of the vial 15.

In the present case, the centering receptacle 26 has four piers 34. The piers 34 extend from the centering receptacle 26 in the direction of the vial 15 (along the direction of gravity 30). The piers 34 are elongated (pin-like). The piers 34 contact the vial 15 with their respective lower ends in the direction of gravity 30 in the neck region 38 of the vial 15. It is conceivable that the extension of the piers 34 is in each case inclined with respect to the direction of gravity. In other words, the piers 34 may also extend obliquely (with respect to the direction of gravity).

Thus, relative movement of the centering device 24 or the centering receptacle 26 in the direction of direction of gravity 30 can generate and transmit a force to the neck region 38 of the vial 15 via the piers 34. In other words, a force can be applied to the neck region 38 of the vial 15 via the piers 34 and aligned in the direction of gravity 30.

If the vials 15 are held in the nest 12 by resilient retaining elements (for example, resilient clips or lugs), for example, in the neck region 38 of the vials 15, a return of the vial 15 into the nest 12 can be made possible or at least facilitated by exerting a force via the piers 34 on the vial 15 or their neck region 38.

The invention claimed is:

1. A device (10) for weighing individual containers (14) arranged in a nest (12), the containers (14) being formed with a bottom region (16) and a lid region (18), and the device (10) comprising:
at least one weighing device (20), the weighing device (20) having at least one load cell (19) for weighing the containers (14) and at least one weighing receptacle (22) for receiving the bottom region (16) of one of the containers (14),
an arrangement unit (28) which is configured to arrange the nest (12) in the device (10) for the weighing operation,
wherein the device (10) is configured such that the weighing receptacle (22) and the arrangement unit (28) are arranged movable relative to each other in order to be able to move a container (14) arranged in the nest (12), which is arranged in the arrangement unit (28), completely out of the nest (12), wherein the device (10) comprises at least one centering device (24) for centering the container (14) to be weighed by means of the weighing device (20), the centering device (24) comprising a centering receptacle (26) for receiving the lid region (18) of the container (14) to be weighed by means of the weighing device (20),
wherein the arrangement unit (28) is arranged to place the nest (12) for the weighing operation between the weighing device (20) and the centering device (24), wherein the arrangement unit (28), the weighing receptacle (22) and/or the centering receptacle (26) are designed to be movable along the direction of gravity (30).

2. The device (10) according to claim 1, characterized in that the weighing receptacle (22) and/or the centering receptacle (26) are designed to be exchangeable.

3. The device (10) according to claim 2, characterized in that the device (10) comprises a handling device (32) for changing the weighing receptacle (22) and/or the centering receptacle (26).

4. The device (10) according to claim 1, characterized in that the centering receptacle (26) has at least one pier (34) for applying a force to the container (14) to be weighed, in order to return the container (14) into the nest (12).

5. The device (10) according to claim 1, characterized in that the centering receptacle (26) is designed as a centering ring.

6. The device (10) according to claim 1, characterized in that the device (10) comprises a gripping device, the gripping device being designed to remove a container (14) from the weighing device (20) after weighing.

7. The device (10) according to claim 1, characterized in that the device (10) comprises a filling and/or closing device (36) arranged to fill and/or close a container (14) whose bottom region (16) is received in the weighing receptacle (22).

8. A set comprising a device (10) according to claim 1, at least one nest (12) and at least one container (14) arranged in the nest (12).

9. A method for weighing individual containers (14) arranged in a nest (12) and having a bottom region (16) and a lid region (18), comprising the steps of:
Providing a nest (12) with at least one container (14) arranged therein;
Receiving the bottom region (16) of a container (14) to be weighed in a weighing receptacle (22) of a weighing device (20) in order to weigh the latter by means of the weighing device (20);
Completely lifting the container (14) to be weighed out of the nest (12) by moving the weighing receptacle (22) and/or the nest (12) relative to each other along the direction of gravity (30);
Weighing the container (14) completely lifted out of the nest (12) by means of the weighing device (20);
Receiving the lid region (18) of the container (14) to be weighed in a centering receptacle (26) in order to center it, wherein the centering receptacle (26) is arranged above the weighing receptacle (22) and above the nest (12) with respect to the direction of gravity.

10. The method according to claim 9, characterized in that the method comprises the step of:

Applying a force to the weighed container (14) to return it to the nest (12).

11. The method according to claim 9, characterized in that the method comprises the steps of:

After weighing a container (14), determining whether the weighed container (14) is a reject container (14);

Removing the container (14) identified as a reject container (14) from the weighing receptacle (22) so that a container (14) identified as a reject container (14) is not returned to the nest (12).

12. The method according to claim 9, characterized in that the method comprises the step of:

Filling and/or closing a container (14) whose bottom region (16) is received in the weighing receptacle (22).

\* \* \* \* \*